(12) United States Patent
Niels

(10) Patent No.: US 8,931,202 B1
(45) Date of Patent: Jan. 13, 2015

(54) HUNTING DECOY WITH GUIDANCE FIN

(76) Inventor: Kenneth R. Niels, Oswego, IL (US)

(*) Notice: Subject to any disclaimer, the term of this patent is extended or adjusted under 35 U.S.C. 154(b) by 348 days.

(21) Appl. No.: 13/385,398

(22) Filed: Feb. 17, 2012

(51) Int. Cl.
*A01M 31/06* (2006.01)

(52) U.S. Cl.
USPC .............................................................. 43/3

(58) Field of Classification Search
CPC ..................................................... A01M 31/06
USPC .................................... 43/2, 3; D22/121, 125
See application file for complete search history.

(56) References Cited

U.S. PATENT DOCUMENTS

| | | | | |
|---|---|---|---|---|
| 1,813,370 | A * | 7/1931 | Villatore et al. | 43/3 |
| 2,162,786 | A * | 6/1939 | Oeding | 43/3 |
| 2,237,194 | A * | 4/1941 | Ohnmacht | 43/3 |
| 2,342,107 | A * | 2/1944 | Agius | 43/3 |
| 3,704,538 | A * | 12/1972 | Gagnon | 43/3 |
| 3,736,688 | A * | 6/1973 | Caccamo | 43/3 |
| 3,768,192 | A * | 10/1973 | Caccamo | 43/3 |
| 3,888,032 | A * | 6/1975 | Gagnon | 43/3 |
| 4,044,416 | A | 8/1977 | Brewer et al. | |
| 4,612,722 | A * | 9/1986 | Ferrell | 43/3 |
| 4,893,428 | A * | 1/1990 | Gagnon, Sr. | 43/3 |
| 5,377,439 | A * | 1/1995 | Roos et al. | 43/3 |
| 5,775,022 | A * | 7/1998 | Sumrall et al. | 43/3 |
| 5,813,890 | A | 9/1998 | Benham | |
| 6,647,657 | B2 * | 11/2003 | Igo | 43/3 |
| 6,760,993 | B2 * | 7/2004 | Lebens | 43/3 |
| 7,610,713 | B1 | 11/2009 | Ellers | |
| 2004/0010957 | A1 | 1/2004 | Corbiere, Jr. | |
| 2005/0108918 | A1 * | 5/2005 | Franceschini | 43/3 |
| 2005/0268522 | A1 * | 12/2005 | Foster et al. | 43/3 |
| 2005/0279005 | A1 * | 12/2005 | Hulley et al. | 43/3 |
| 2006/0283071 | A1 * | 12/2006 | Haley | 43/3 |
| 2008/0256838 | A1 | 10/2008 | Fanfelle | |
| 2009/0151137 | A1 * | 6/2009 | Darling, III | 24/568 |
| 2009/0178292 | A1 * | 7/2009 | Stengel et al. | 33/809 |
| 2011/0146132 | A1 * | 6/2011 | Young | 43/3 |
| 2011/0203154 | A1 * | 8/2011 | Price | 43/3 |
| 2011/0232154 | A1 * | 9/2011 | Crank, Jr. | 43/3 |
| 2011/0239517 | A1 * | 10/2011 | Gazalski | 43/3 |
| 2012/0073180 | A1 * | 3/2012 | Elliott et al. | 43/3 |

FOREIGN PATENT DOCUMENTS

CA  1287737  8/1986

* cited by examiner

*Primary Examiner* — David Parsley
*Assistant Examiner* — Morgan T Barlow

(57) ABSTRACT

A hunting decoy with a body has a guidance fin being both movably positioned and releasably attachable below the body of the decoy. Water contact with the guidance fin permits the decoy to have a lifelike movement. Baffles applied to the guidance fin permit a more lifelike movement for the decoy.

1 Claim, 9 Drawing Sheets

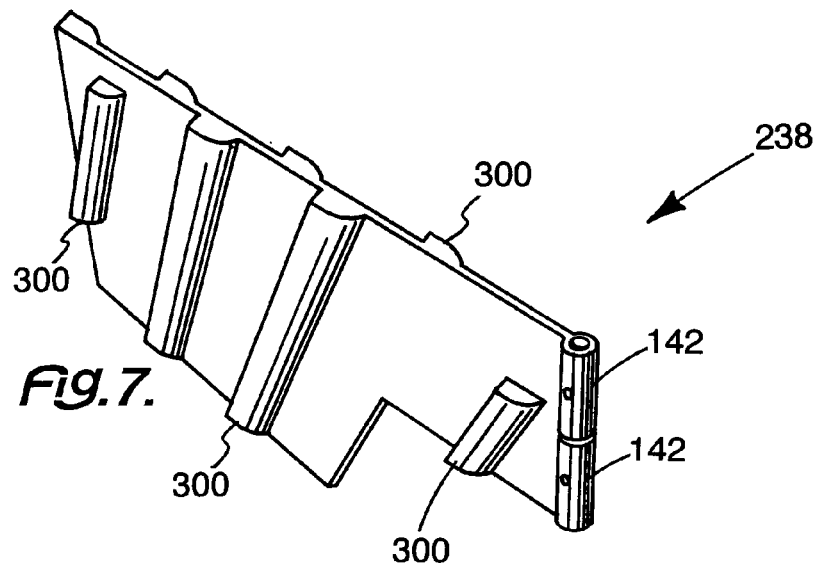
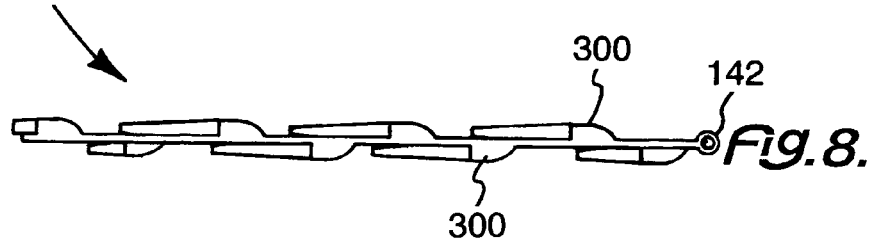
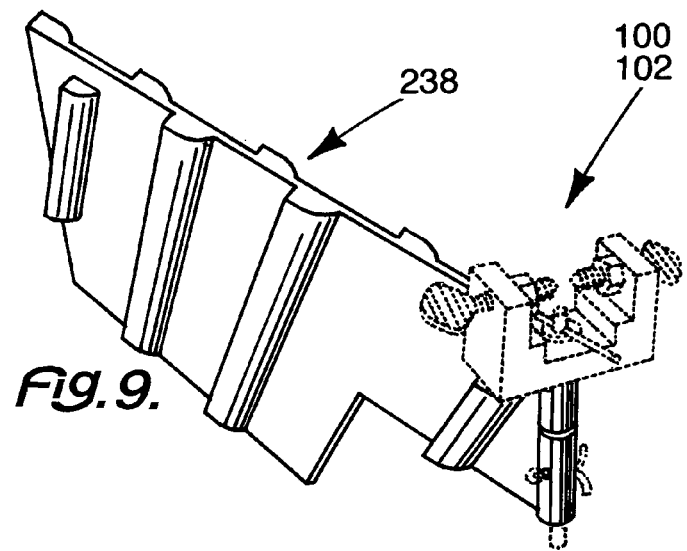

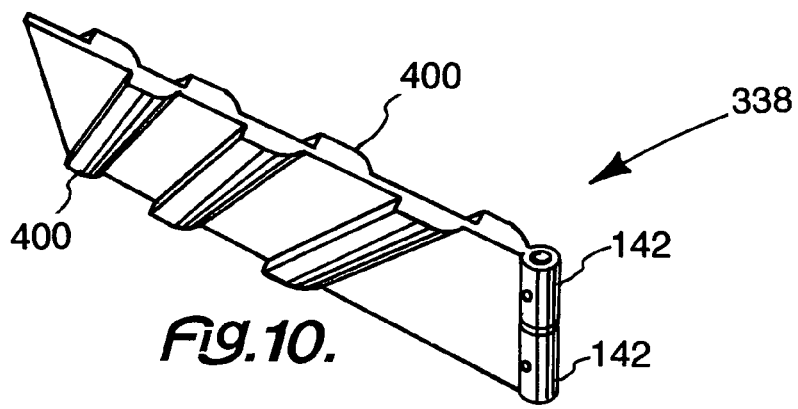
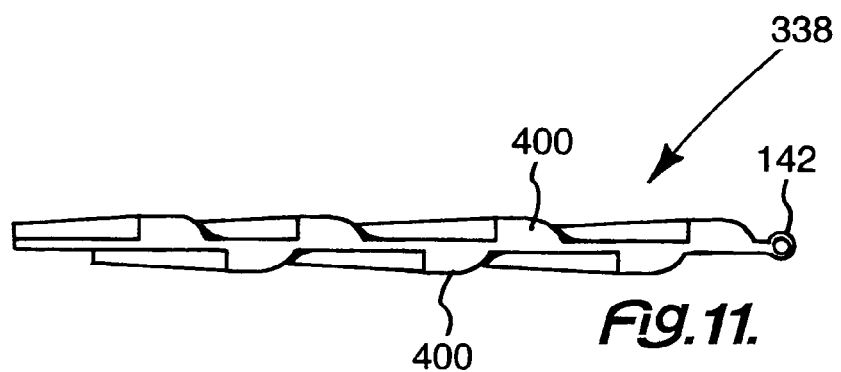
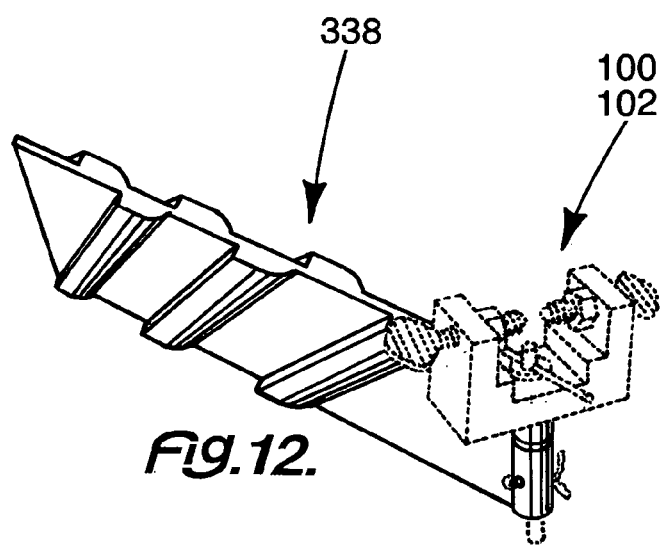

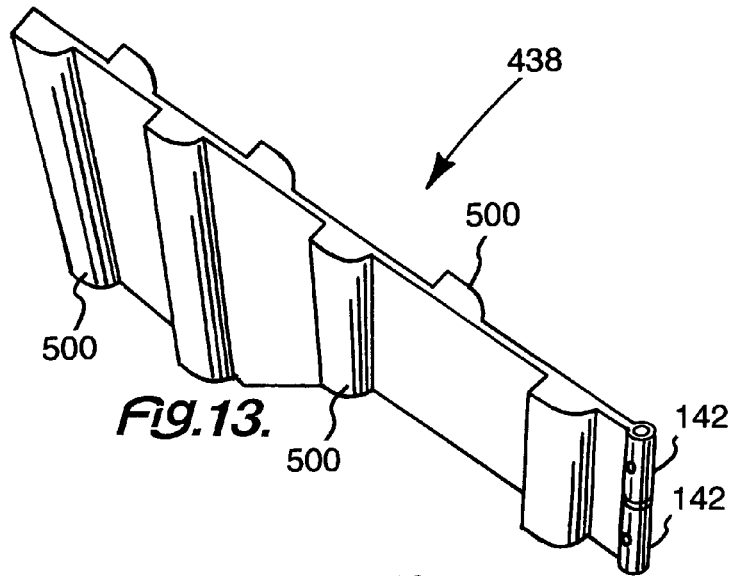
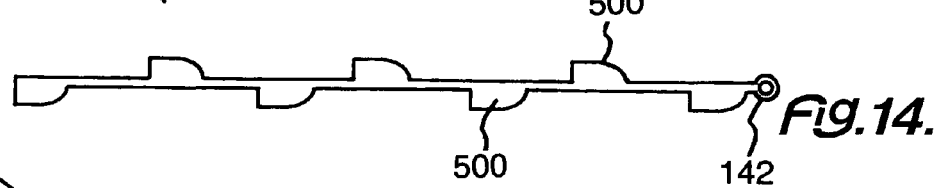
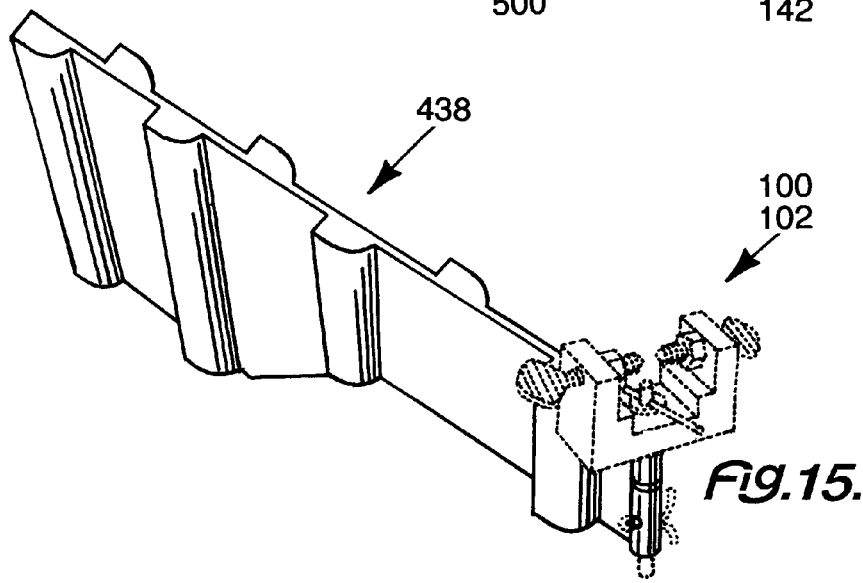

HUNTING DECOY WITH GUIDANCE FIN

This invention relates to a hunting decoy, and more particularly to a hunting decoy having a guidance fin mounted on the bottom thereof so that water currents will cause movement of the decoy.

BACKGROUND OF THE INVENTION

In hunting, especially for water fowl, it is customary to use at least one decoy, and disperse any available decoy on water, in order to attract a desired water fowl into a desired range for a hunter. As the decoy increases in its quality, especially of a realistic appearance or movement, greater effectiveness of the decoy is achieved. Clearly, the purpose of the decoy is to attract water fowl to a desired area. With the decoys being more realistic, the decoys will be more effective in attracting the desired water fowl.

Typically, geese and ducks are hunted during a designated hunting season. The hunter will go to a water area, in which, water fowl are known to congregate. To assist in attracting geese or ducks or other water fowl to the area, one or more decoys resembling those birds are placed on the water.

It is now known that the more realistic decoys attract more birds. Many attempts are known to make the decoys more realistic. A key factor, for increasing the realism of the decoy, is providing movement to the decoy.

Such movement must be accomplished in a reasonable fashion without making deployment of the decoy more difficult. Yet movement inherently implies a mechanism, which leads to complexity of the decoy. As complexity of the decoy increases, a decline in (1) the ease of transportation of the decoys, (2) the dispersal of the decoys for hunting and (3) the retrieval of the decoys for the homeward-bound trip, greatly detracts from the use thereof.

Typically, movement for a decoy is accomplished by a mechanical or electrical device. Such devices add greatly to the complication of the decoy. Also, the electronics or mechanics, used to achieve the movement, require the use of grease, batteries, or other materials, which can have a polluting function. It is very desirable to avoid these problems.

It is very desirable to achieve the desired movement in the decoy, with a minimal increase in complexity for the decoy structure. Such a structure, while being desirable, is difficult to obtain.

SUMMARY OF THE INVENTION

Among the many objectives of this invention is the provision of a hunting decoy with a guidance fin.

A further objective of this invention is the provision of a hunting decoy, which is easily dispersed for hunting.

Yet a further objective of this invention is the provision of a hunting decoy to attract water fowl.

A still further objective of this invention is the provision of a hunting decoy, which is easily transported.

Another objective of this invention is the provision of a hunting decoy, which is easily retrieved.

Yet another objective of this invention is the provision of a hunting decoy, which has a moving part.

Still, another objective of this invention is the provision of a hunting decoy, with a simplified moving part.

Also, an objective of this invention is the provision of a hunting decoy, which avoids electrical movement.

These and other objectives of the invention (which other objectives become clear by consideration of the specification, claims and drawings as a whole) are met by providing a hunting decoy, having a body with a guidance fin being both movably positioned and releasably attachable below the body of the decoy.

BRIEF DESCRIPTION OF THE DRAWINGS

FIG. 7 depicts a top perspective view of large rudder with diagonal ribs 238 based on the guidance fin 100 of this invention.

FIG. 8 depicts a top plan view of large rudder with diagonal ribs 238 based on the guidance fin 100 of this invention.

FIG. 9 depicts a top perspective view of clamp 102 in combination with large rudder with diagonal ribs 238 based on the guidance fin 100 of this invention.

FIG. 10 depicts a top perspective view of small rudder with diagonal ribs 338 based on the guidance fin 100 of this invention.

FIG. 11 depicts a top plan view of small rudder with diagonal ribs 338 based on the guidance fin 100 of this invention.

FIG. 12 depicts a top perspective view of clamp 102 in combination with diagonal ribs 338 based on the guidance fin 100 of this invention.

FIG. 13 depicts a top perspective view of large rudder with vertical ribs 438 based on the guidance fin 100 of this invention.

FIG. 14 depicts a top plan view of large rudder with vertical ribs 438 based on the guidance fin 100 of this invention.

FIG. 15 depicts a top perspective view of clamp 102 in combination with of large rudder with vertical ribs 438 based on the guidance fin 100 of this invention.

Throughout the figures of the drawings, where the same part appears in more than one figure of the drawings, the same number is applied thereto.

DESCRIPTION OF THE PREFERRED EMBODIMENTS

Figure 1:
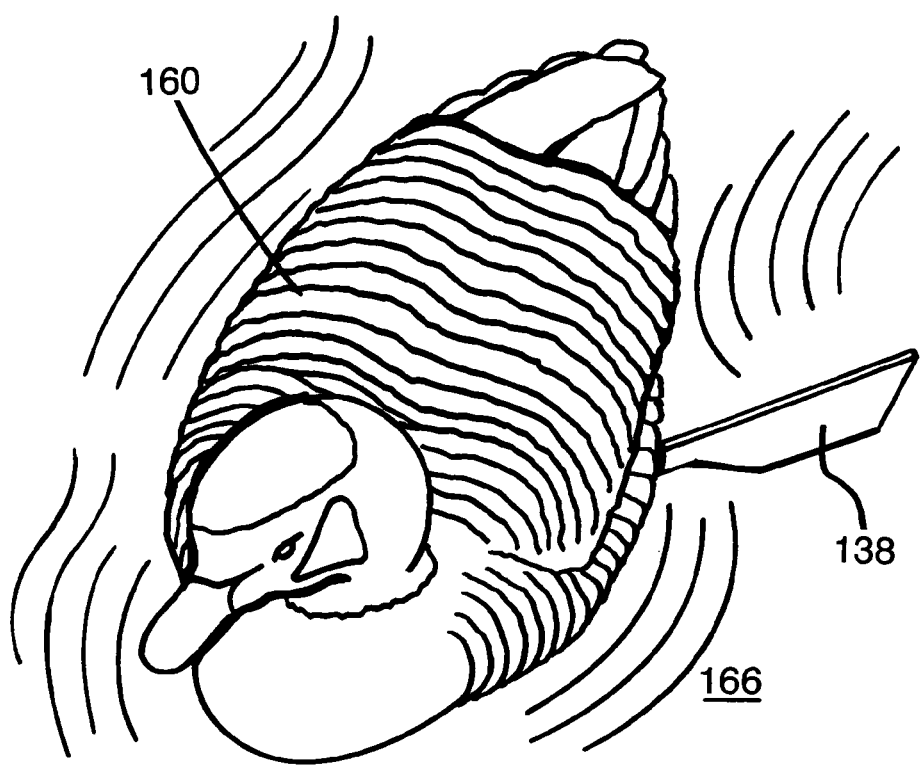
FIG. 1 depicts a top perspective view of the guidance fin 100 of this invention in use on a hunting decoy 160 in water 166.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

These decoys may be formed from any suitable material. The main requirement for material is that it floats on water, receives appropriate decoy colors, and provides an appropriate decoy shape. Thus, the decoys can be made from metal, wood, synthetic resin or plastic, or combinations thereof. The resin or plastic may be solid or foamed.

To a decoy for use in hunting water fowl is attached a live motion device or a guidance fin on a bottom of the decoy. The guidance fin can be made from metal, wood, synthetic resin or plastic, or combinations thereof. The guidance fin includes a rudder connected to clamp body through a rudder shaft. The rudder is permitted to move about the rudder shaft through a restricted arc. As the water movement of the body of water on which the decoy is placed contacts and causes the rudder to move, the decoy achieves a lifelike movement, which encourages the desired water fowl to approach the range of a gun used by a hunter.

The guidance fin is especially suitable for a goose decoy. However, a smaller version of the guidance fin can be used effectively on a duck decoy. Also the size of the guidance fin can adjusted for any other appropriate game animal. The clamp body provides for easy attachment to, or removal of the guidance fin from, the decoy. Thus, the decoy with the guidance fin can easily be assembled at the hunting site for use thanks to the clamp body. The decoy can also have the guidance fin easily removed therefrom through the clamp body, which provides for ease of storage or transportation.

Baffles on the guidance fin create an even better random movement of the decoy as the water strikes the baffles. The baffles are believed to cause a more random water movement. This results in a more random movement of the decoy.

Figure 2:
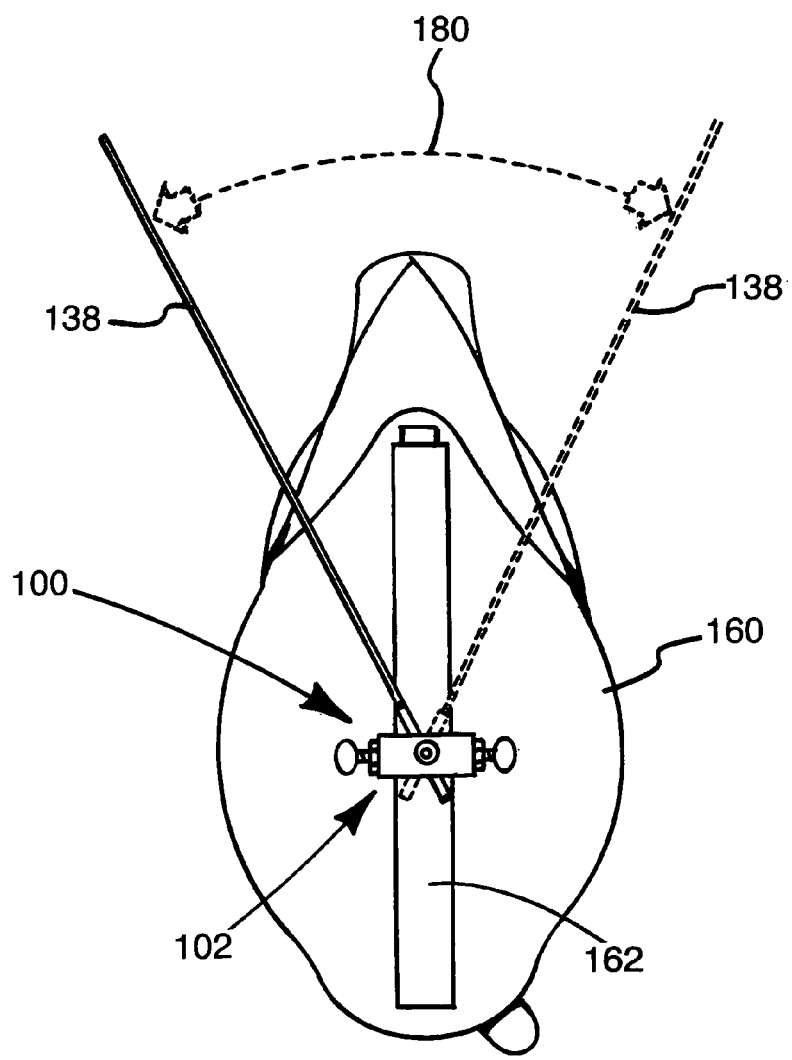
FIG. 2 depicts a bottom plan view of the guidance fin 100 of this invention in use on a hunting decoy 160.
Figure 3:
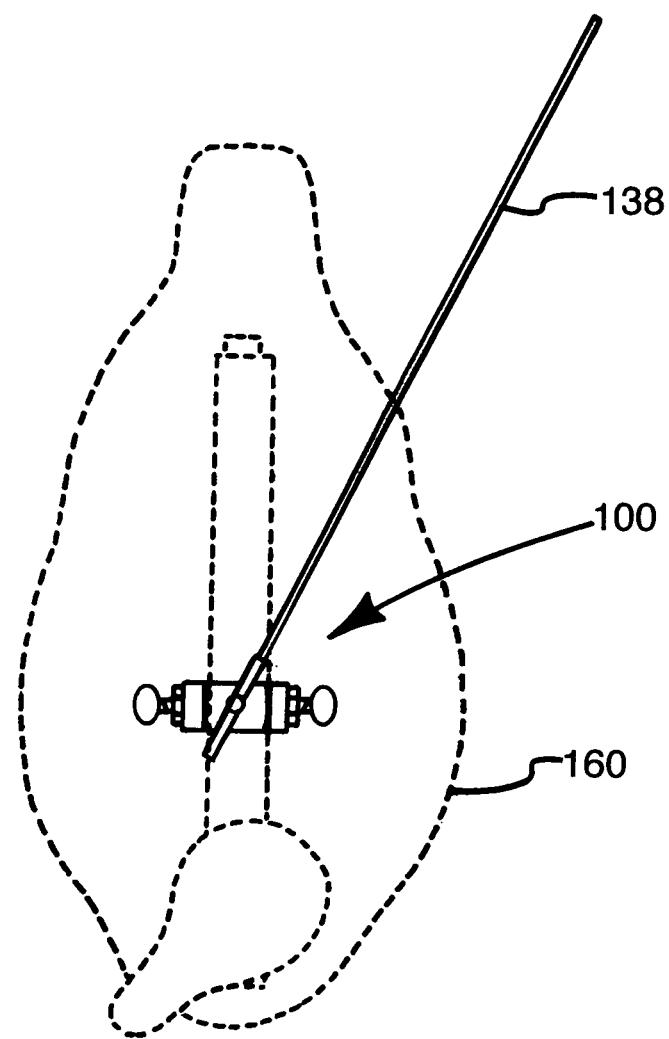
FIG. 3 depicts a bottom plan view of the guidance fin 100 of this invention in use on a hunting decoy 160, with the hunting decoy 160 shown in phantom.
Figure 4:
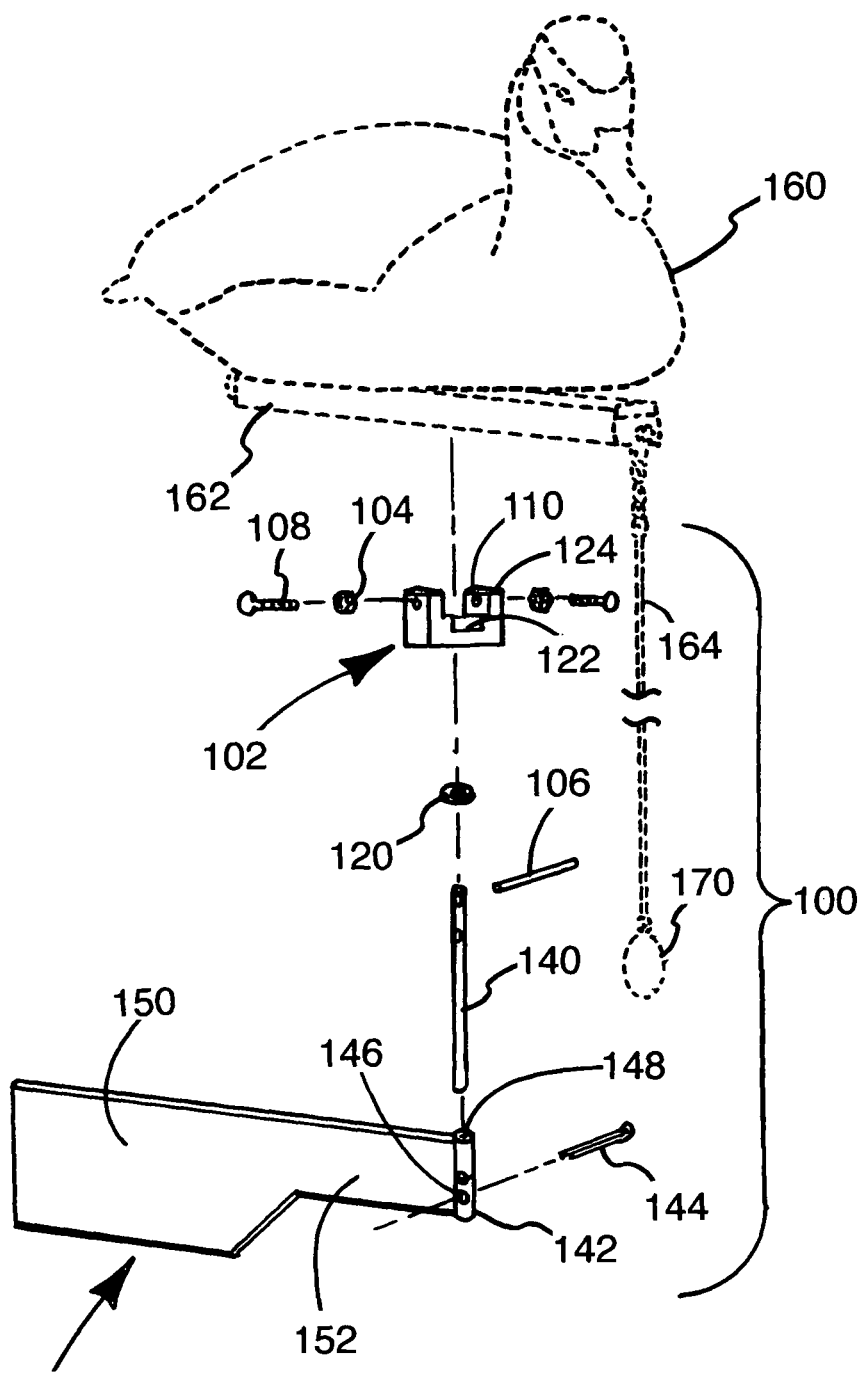
FIG. 4 depicts an exploded perspective view of the guidance fin 100 of this invention in use on a hunting decoy 160, with the hunting decoy 160 shown in phantom.

Referring now to FIG. 1, FIG. 2, FIG. 3, and FIG. 4, the guidance fin 100 is positioned on the hunting decoy 160. The hunting decoy 160 may be for duck or a goose or another appropriate game animal. As shown in FIG. 1, the hunting decoy 160 may be positioned on a body of water 166. As shown in FIG. 2, clamp body 102 holds guidance fin 100 on the bottom of hunting decoy 160 at its keel 162. The hunting decoy 160 may be used alone or in combination with other hunting decoys 160. Rudder 138 of guidance fin 100 provides lifelike movement to hunting decoy 160.

The swing motion 180 of rudder 138 is depicted in FIG. 2. The position of swing stop pin 106 provides this limited range of movement to rudder 138. In this fashion, the movement of the decoy 160 becomes more lifelike.

Figure 5:
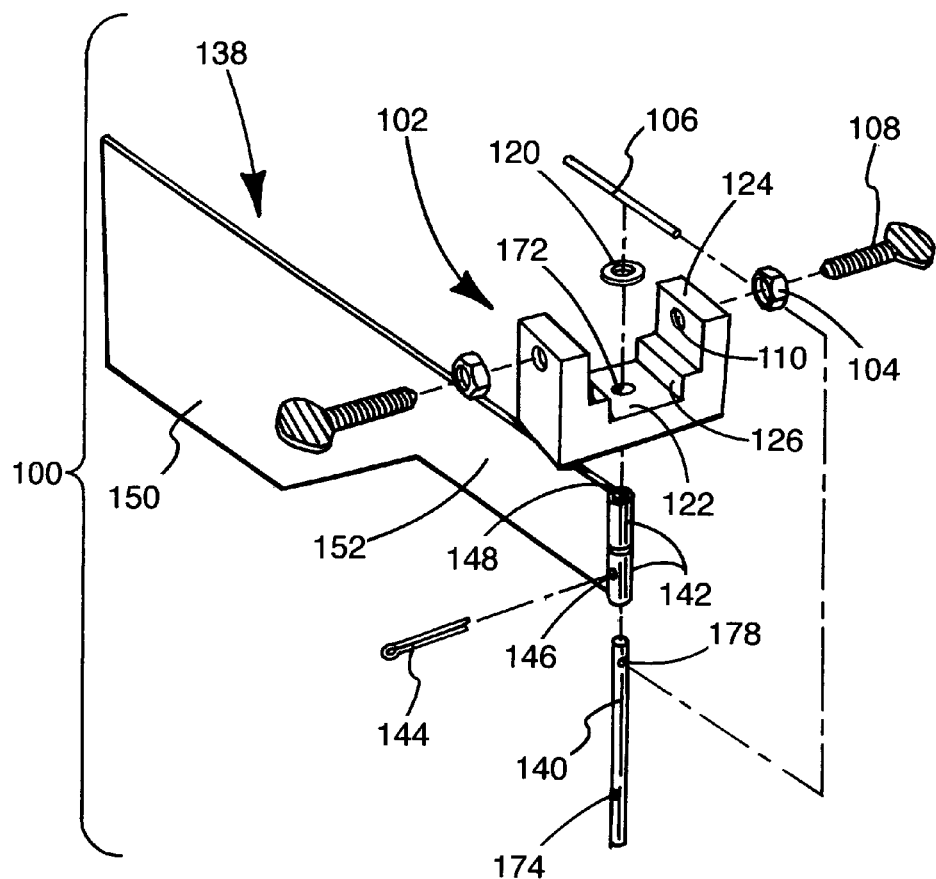
FIG. 5 an exploded perspective view of the guidance fin 100 of this invention.
Figure 6:
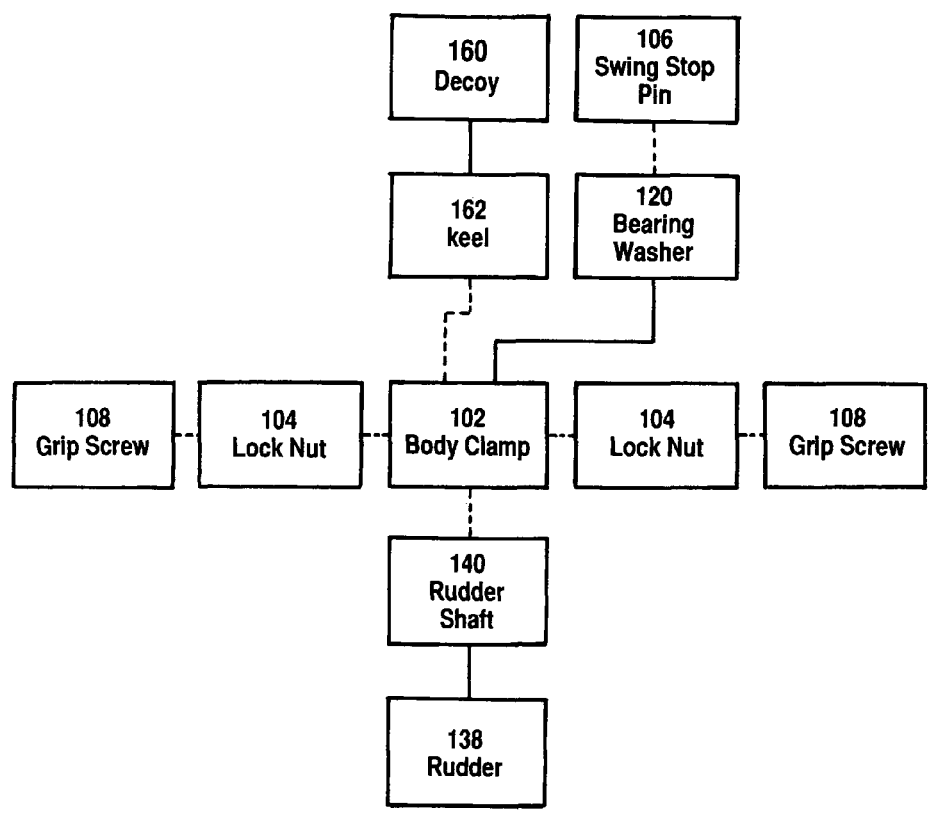
FIG. 6 depicts a box diagram of the guidance fin 100 of this invention.

By adding FIG. 5 and FIG. 6 to the consideration, the structure of guidance fin 100 becomes more clear. Guidance fin 100 includes clamp body 102 holding rudder 138 onto to decoy 160 through rudder shaft 140. Clamp body 102 is generally a rectangular U-shaped piece. A lock nut 104 is positioned on each arm 124 of clamp body 102 in line with each threaded aperture 110 within each arm thereof.

In this fashion, each grip screw 108 goes into threaded relation with both lock nut 104 and threaded aperture 110. By passing therethrough, each grip screw 108 can contact keel 162 of decoy 160 to thereby lock clamp body 102 onto decoy 160.

Rudder shaft 140 is secured to clamp body 102 at bearing cradle 122. Bearing cradle 122 forms the base of U-shaped clamp body 102. Adjacent bearing cradle 122, at each arm 124 is a brace 126 to add strength to clamp body 102.

Into rudder shaft 140 fits a swing stop pin 106 at stop pin aperture 178. Below the swing stop pin 106 is bearing washer 120. Bearing washer 120 rests in bearing cradle 122 as swing stop pin 106 has limited movement due its position between both arms 124 or braces 126.

Rudder 138 fits on rudder shaft 140 at rudder collar 148 and into rudder sleeve 142. Rudder fastener 144 fits through sleeve aperture 146 and rudder pin aperture 174 to hold rudder shaft 140 in place. Rudder pin aperture 174 is below stop pin aperture 178.

Rudder 138 is preferably a flat, shaped piece of material, which is rigid or semi rigid. Rudder 138 has rudder sleeve 142. Rudder sleeve 142 extends into strut section 152, which provides the connection between wall section 150 of rudder 138 and rudder sleeve 142. Wall section 150 is wider than strut section 152.

At the end of keel 162 of decoy 160 is a tether 164. A weight 170 is secured to the end of tether 164. The weight 170 is oppositely disposed from the keel 162. The weight 170 adds stability to the keel 162 and hence the decoy 160.

Turning now to FIG. 6, decoy 160 has a keel 162. To the keel 162 is mounted clamp body 102. A bearing washer 120 and a swing stop pin 106 are between the keel 162 and clamp body 102. From each side of the clamp body 102 extends a lock nut 104 and a grip screw 108. Below the clamp body 102 are the rudder shaft 140 and the rudder 138. The rudder 138 provides a lifelike movement for the decoy 160. Such movement is due to the current or movement of the water on which, the decoy 160 rests.

Turning now FIG. 7, FIG. 8 and FIG. 9, the guidance fin 100 is now large rudder with diagonal ribs 238, with the addition of slanted baffles 300. Slanted baffles 300 are preferably in the range of 35° to 40° from the vertical. Slanted baffles 300 provide extra contact with flowing water and produce a more lifelike movement of the decoy 160. Clamp body 102 works in the same fashion on large rudder with diagonal ribs 238, as it does on guidance fin 100.

In a like manner with FIG. 10, FIG. 11, and FIG. 12, the guidance fin 100 is now small rudder with diagonal ribs 338, with the addition of second slanted baffles 400. Second slanted baffles 400 are preferably 40 to 50° from the vertical. Slanted baffles 400 also provide extra contact with flowing water and produce a more lifelike movement of the decoy 160. Clamp body 102 works in the same fashion on small rudder with diagonal ribs 338 as it does on guidance fin 100.

Furthermore, in FIG. 13, FIG. 14, and FIG. 15, the guidance fin 100 is now large rudder with vertical ribs 438, with the addition of vertical baffles 500. Vertical baffles 500 are disposed vertically on the guidance fin 100 and substantially perpendicular to decoy 160. Vertical baffles 500 also provide extra contact with flowing water and produce a more lifelike movement of the decoy 160. Clamp body 102 works in the same fashion on large rudder with vertical ribs 438 as it does on guidance fin 100.

This application - - - taken as a whole with the abstract, specification, claims, and drawings being combined - - - provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

What is claimed is:
1. A guidance fin for a hunting decoy comprising:
 a) the guidance fin being adapted to be both movably positionable and releasably attachable below a body of the hunting decoy;
 b) the guidance fin further including a rudder connected to a clamp body, the rudder having a rear end that is wider than a front end and the front end of the rudder defining a rudder sleeve, the rudder sleeve receiving a lower end of a rudder shaft;
c) a rudder shaft connecting the rudder to the clamp body;
d) the rudder being movable about the rudder shaft through a restricted arc;
e) the guidance fin further including a clamp body to provide for easy attachment of the guidance fin to the hunting decoy;
f) the guidance fin being easily removed from the hunting decoy through the clamp body, in order to provide for ease of storage or transportation for the hunting decoy;
g) the guidance fin being secured to a keel of the hunting decoy;
h) the guidance fin including a swing stop pin;
i) the swing stop pin being positioned to limit a movement of the rudder and provide the restricted arc;
j) a clamp body holding the rudder of the guidance fin on the hunting decoy;
k) the clamp body being a rectangular U-shaped piece, the U-shaped piece defining a channel between the first and second arms, opposed braces defined inside the channel extending from the base upward along the first and second arms, the length of the braces less than the length of the arms, the base of the U-shaped piece having an opening receiving a top end of the rudder shaft, the rudder shaft top end having an opening receiving the swing stop pin such that the swing stop pin is perpendicular to the rudder shaft, with the swing stop pin disposed within the channel of the U-shaped piece; and
l) each grip screw contacting the keel of the hunting decoy to thereby lock the clamp body onto the hunting decoy and support the guidance fin.

* * * * *